(12) United States Patent
Tingle et al.

(10) Patent No.: US 7,678,165 B2
(45) Date of Patent: Mar. 16, 2010

(54) PARTICLE SEPARATOR USING BOUNDARY LAYER CONTROL

(75) Inventors: Walter Jackson Tingle, Danvers, MA (US); Wayne R. Oliver, Mason, OH (US); Kevin Kirtley, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 382 days.

(21) Appl. No.: 11/646,503

(22) Filed: Dec. 28, 2006

(65) Prior Publication Data

US 2008/0156187 A1      Jul. 3, 2008

(51) Int. Cl.
*B01D 45/00* (2006.01)
(52) U.S. Cl. .............................. 55/306; 55/307; 55/438; 55/394; 55/385.3; 55/413; 55/414; 55/437; 55/440; 73/861.18; 60/39.092; 95/23; 95/29; 95/267; 96/397; 96/389; 96/422
(58) Field of Classification Search .................... 55/306, 55/307, 438, 394, 385.3, 413, 414, 437, 440; 73/861.18; 60/39.092; 95/23, 29, 267; 96/397, 96/389, 422; 244/53 B
See application file for complete search history.

(56) References Cited

U.S. PATENT DOCUMENTS

| | | | |
|---|---|---|---|
| 3,766,719 A | 10/1973 | McAnally, III | |
| 3,832,086 A | 8/1974 | Hull, Jr. et al. | |
| 3,978,656 A | 9/1976 | Murphy | |
| 4,509,962 A | 4/1985 | Breitman et al. | |
| 4,527,387 A | 7/1985 | Lastrina et al. | |
| 4,685,942 A * | 8/1987 | Klassen et al. | 55/306 |
| 4,704,145 A | 11/1987 | Norris et al. | |
| 4,844,382 A * | 7/1989 | Raisbeck | 244/53 B |
| 4,928,480 A * | 5/1990 | Oliver et al. | 60/39.092 |
| 5,039,317 A * | 8/1991 | Thompson et al. | 95/272 |
| 5,139,545 A * | 8/1992 | Mann | 55/306 |
| 6,499,285 B1 * | 12/2002 | Snyder | 60/39.092 |
| 6,508,052 B1 * | 1/2003 | Snyder et al. | 60/39.092 |
| 6,698,180 B2 * | 3/2004 | Snyder | 60/39.092 |
| 7,296,395 B1 * | 11/2007 | Hartman et al. | 60/39.092 |
| 7,374,593 B2 * | 5/2008 | Snyder | 55/440 |
| 2003/0196548 A1 | 10/2003 | Hartman | |

* cited by examiner

*Primary Examiner*—Duane Smith
*Assistant Examiner*—Minh-Chau T Pham
(74) *Attorney, Agent, or Firm*—V G Ramaswamy; William Scott Andes (57) ABSTRACT

A particle separator which broadly includes: an inner wall, an outer wall and a splitter, wherein the inner and outer walls define an air intake passageway, and wherein the splitter is positioned between the inner and outer walls so as to define a scavenge air flow passageway connected to the intake passageway and a main air flow passageway connected to the intake passageway; the inner wall having a humped-shaped portion between the intake passageway and the main air flow passageway; the humped-shaped portion having a peak and a radius of curvature at any point on the hump-shaped portion of the inner wall after the peak corresponding to a degree of curvature of from about 30 to about 60 degrees; and a boundary layer control mechanism for providing active boundary layer control along the inner wall after the peak and within the main air flow passageway. Also provided is a method for providing active boundary layer flow control along the inner wall after the peak and within the main air flow passageway.

20 Claims, 7 Drawing Sheets

PARTICLE SEPARATOR USING BOUNDARY LAYER CONTROL

BACKGROUND OF THE INVENTION

This invention broadly relates to a particle separator for a gas turbine engine providing for improved particle separation by increasing the splitter hiding height, decreasing the radius of curvature of the humped-shaped portion of the inner wall after the peak of the humped-shaped portion, and providing active boundary layer control along the inner wall after the peak and within the main air flow passageway. This invention further broadly relates to a method for providing such active boundary layer control along the inner wall after the peak and within the main air flow passageway.

Aircraft gas turbine engines may be susceptible to damage from foreign objects introduced into air inlets of the engines. This problem has been most acute in the past with respect to relatively large foreign objects such as stones, gravel, birds and hail.

With the advent of gas turbine powered helicopters and other vertical takeoff and landing (VTOL) aircraft, smaller particles of foreign matter such as sand and dust have become increasingly troublesome due primarily to the conditions under which such VTOL aircraft may be operated. The advantage of VTOL capability makes such aircraft particularly useful in areas where conventional air fields do not exist, for example, in combat zones and other isolated areas. VTOL aircraft may be also specially suited for certain low-altitude missions over both land and sea. Under these and other similar conditions, substantial quantities of small foreign objects such as sand, dust, etc., may become entrained in intake air supplied to the gas turbine engine. These foreign particles, which individually have relatively little effect on the engine, may cause very substantial damage when ingested into the engine in large quantities.

For example, recent experience has shown that engines in helicopters operating at low altitude in a desert environment may lose performance very rapidly due to erosion of the engine blading due to the ingestion of sand particles, dust particles, etc. Similar problems may occur when operating over salt water because of the heavy ingestion of salt-water droplets which may cause both corrosion and destructive erosion of turbine structures.

Gas turbine engines, including those used in VTOL aircraft often include an intake for receiving all of the air entering the engine and a compressor inlet for receiving air entering the engine compressor. Each engine may further include interior walls defining a main or primary flowpath for air traveling from the intake to the compressor inlet. In order to reduce the ingestion of foreign particles, such as sand, dust, salt, etc., by the engine, a particle separator system may be employed at the compressor inlet for scavenging foreign particles from the engine intake air. Such separator systems may include, for example an annular partition, or splitter lip, appropriately positioned in relationship to the primary flowpath so that when the gas turbine is in operation, air intended for use by the compressor is directed along one side of the splitter lip, while foreign particles carried by the air entering the intake are directed along the other side of the splitter lip (often referred to as the "scavenge" pathway or flow) for collection and subsequent removal. See, for example, commonly assigned U.S. Pat. No. 3,832,086 (Hull, Jr. et al.), issued Aug. 27, 1974; U.S. Pat. No. 4,265,646 (Weinstein et al.), issued May 5, 1981; and U.S. Pat. No. 4,527,387 (Lastrina et al.), issued Jul. 9, 1985.

Accordingly, it would be desirable to provide a particle separator system which: (1) improves particle separation efficiency; (2) without affecting or minimizing the effect on air flow to the compressor that may undesirably affect engine performance.

BRIEF DESCRIPTION OF THE INVENTION

An embodiment of this invention is broadly directed at a particle separator comprising:
 an inner wall, an outer wall and a splitter, wherein the inner and outer walls define an air intake passageway, and wherein the splitter is positioned between the inner and outer walls so as to define a scavenge air flow passageway connected to the intake passageway and a main air flow passageway connected to the intake passageway;
 the inner wall having a humped-shaped portion between the intake passageway and the main air flow passageway;
 the humped-shaped portion having a peak and a radius of curvature at any point on the hump-shaped portion of the inner wall after the peak corresponding to a degree of curvature of from about 30 to about 60 degrees; and
 a boundary layer control mechanism for providing active boundary layer control along the inner wall after the peak and within the main air flow passageway.

Another embodiment of this invention is broadly directed at a comprising the following steps:
 (a) providing a particle separator comprising an inner wall, an outer wall and a splitter, wherein the inner and outer walls defines an air intake passageway, and wherein the splitter is positioned between the inner and outer walls so as to define a scavenge air flow passageway connected to the intake passageway and a main air flow passageway connected to the intake passageway, the inner wall having a humped-shaped portion between the intake passageway and the main air flow passageway, the humped-shaped portion having a peak and a radius of curvature at any point on the hump-shaped portion of the inner wall after the peak corresponding to a degree of curvature of from about 30 to about 60 degrees; and
 (b) providing active boundary layer flow control along the inner wall after the peak and within the main air flow passageway.

DETAILED DESCRIPTION OF THE INVENTION

As used herein, the term "particle separator" refers to a device (e.g., inertial particle separator) for removing, for example, sand particles, dust particles, salt particles, etc., from an inlet air stream of, for example, a gas turbine engine, other type of engine, industrial device, etc.

As used herein, the term "splitter" (also known as a "splitter lip") refers to a device for removing, separating, etc., various entrained foreign objects, for example, sand particles, dust particles, salt particles, etc., from the inlet air stream of, for example, a gas turbine engine, other type of engine, industrial device, etc., to provide a main or core air flow stream having a minimized, reduced, etc., level of such entrained foreign objects.

As used herein, the term "rain step" refers to a (e.g., a relatively small) recess, indentation, groove, etc., on the peak (i.e., maximum radius) of an inlet particle separator inner flowpath hump-shaped portion, and that is intended to provide a (e.g., small) discontinuity to, for example, discard, shed, get rid of, etc., sheeted water from the inner flowpath.

As used herein, the term "flow separation" refers to the conventional meaning of this term, namely a tendency of a fluid to cease flowing smoothly along a surface and to detach into a separate stream and associated vortices and turbulent areas.

As used herein, the term "flow curvature" refers to a smooth deviation of a streamline, streakline, etc., from a straight path in a flow field; the radius of curvature is an example of such a streamline.

As used herein, the term "boundary layer" refers to the conventional meaning of this term, namely a region of viscosity-dominated flow near a surface.

As used herein, the term "active boundary layer control" refers to the use of a means, method, mechanism, technique, etc., for example, flow suction, injection of air flow into a boundary layer, etc., to improve the behavior of the boundary layer flow and to prevent, eliminate, minimize, reduce, decrease, etc., boundary layer flow separation.

As used herein, the term "degree of curvature" refers to the conventional meaning of this term, namely the central angle formed by two radii of curvature for a point along the hump-shaped portion of the inner wall after the peak, wherein the two radii extend from the center of a circle of curvature to the ends of an arc measuring a set distance from a first point to a second point on the circle of curvature.

As used herein, the term "splitter hiding height" refers to the distance between the peak of the hump-shaped portion of the inner wall and the leading edge of the splitter.

As used herein, the term "hump-to-splitter angle" refers to a tangent angle between the peak of the hump-shaped portion of the inner wall and the leading edge of the splitter.

As used herein, the term "throat width" refers to the size, width, etc., of a minimum area position in, for example, an annular or other simple flowpath.

As used herein, the term "mean air inlet angle" refers to a mean angle between the inner and outer flowpath walls in the inlet section of the flowpath.

As used herein, the term "inboard surface" refers to the radially inboard surface.

As used herein, the term "outboard surface" refers to the radially outboard surface.

As used herein, the term "particle rebound" or "particle bounce" refer interchangeably to the recoil of particles after colliding with surfaces of the particle separator, for example, the inner wall, outer wall, splitter, etc.

As used herein, the term "core loss" refers to the total pressure loss from the inlet into the inboard or core flowpath.

As used herein, the term "bypass loss" refers to the total pressure loss from the inlet to the outboard, scavenge, or bypass flowpath.

As used herein, the term "scavenge power" refers to the power required to drive the scavenge suction system, for example, a blower or ejector.

As used herein, the term "blowing power" refers to the power required to pump, energize, boost, rejuvenate, etc., an active boundary, layer control (blowing) flow.

As used herein, the term "core mass flow" refers to the mass flow which enters the inboard or core flowpath.

As used herein, the term "comprising" means various operations, steps, data, stations, components, parts, devices, techniques, parameters, etc., may be conjointly employed in this invention. Accordingly, the term "comprising" encompasses the more restrictive terms "consisting essentially of" and "consisting of."

Figure 1:
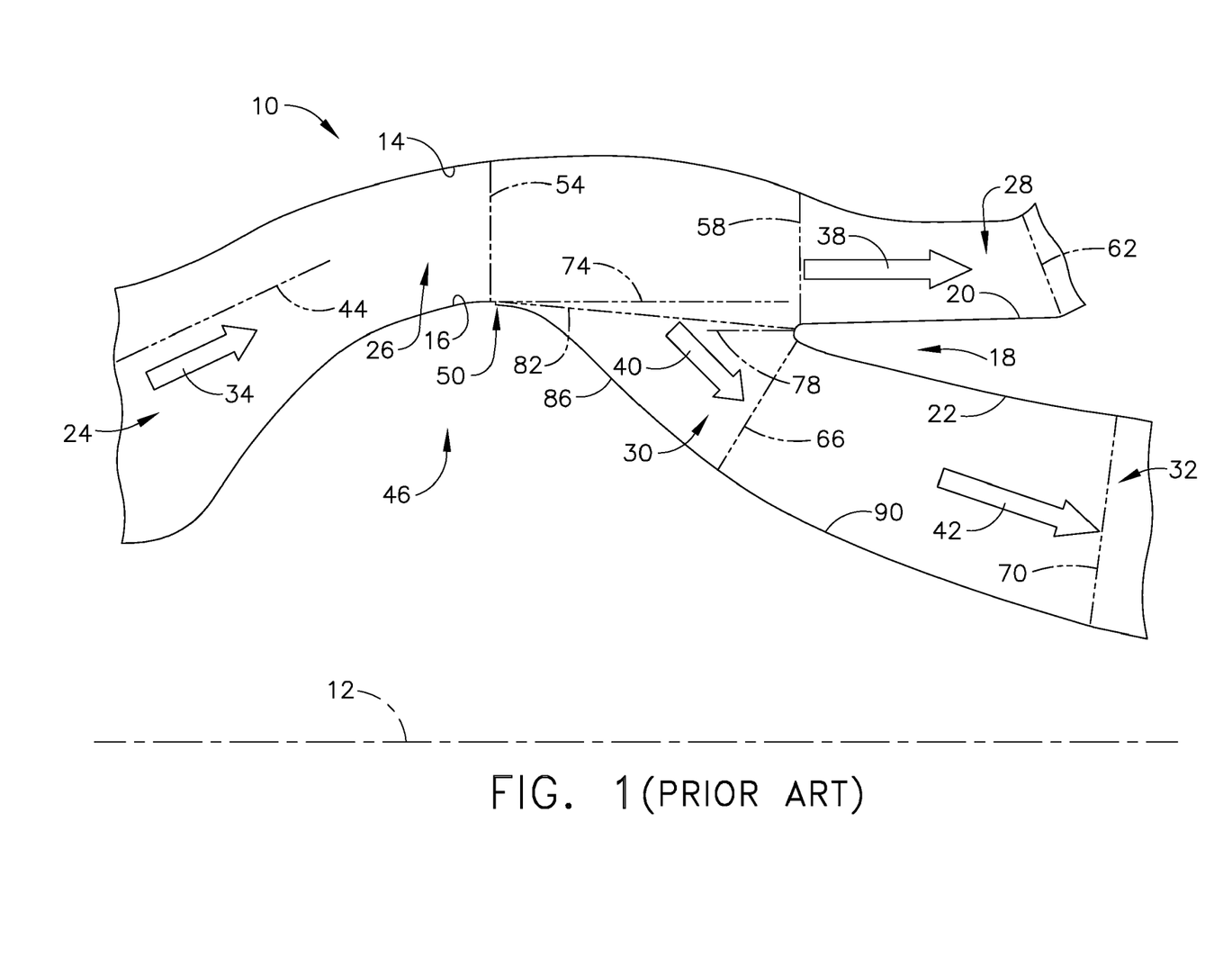
FIG. 1 is a sectional view of a schematic of a conventional configuration of a particle separator for gas turbine engine.

Embodiments of this invention provide the ability in particle separators used in gas turbine engines to: (1) improve particle separation efficiency; (2) without affecting, minimizing, reducing, etc., air flow to the compressor that may undesirably affect engine performance. Previously, gas turbine engine particle separators used very conventional inertial forces to achieve separation of particles from the entraining air stream. This is further illustrated by reference to FIG. 1 which shows a conventional configuration of a particle separator indicated generally by 10 for a gas turbine engine. FIG. 1 shows particle separator 10 positioned relative to the engine center line indicated by dashed line 12. Particle separator 10 comprises an outer wall 14 (i.e., relative to engine center line 12), an inner wall 16 and a splitter indicated generally as 18. Splitter 18 is positioned between inner wall 16 and outer wall 18, and comprises an outer wall 20 (i.e., relative to engine center line 12) and an inner wall 22.

Particle separator 10 is provided with an air intake or inlet indicated generally as 24 and an air intake passageway indicated generally as 26 defined by outer and inner walls 14 and 16. Aft or rearward of intake passageway 26, splitter 18 defines or divides particle separator 10 into a scavenge air flow passageway indicated generally by 28 and a main or core passageway indicated generally as 30. At the trailing or rearward end of main passageway 30 is the core engine or compressor inlet passageway indicated generally as 32 which leads to the compressor section (not shown) of the gas turbine engine.

As shown in FIG. 1, air entering air inlet 24 provides initially an inlet air flow indicated by and moving generally in the direction of arrow 34. As inlet air flow 34 passes through intake passageway 26 and reaches splitter 18, it is divided into a scavenge air flow indicated by and moving generally in the direction of arrow 38 which passes through scavenge air flow passageway 28, and a main or core air flow indicated by and moving generally in the direction of arrow 40 which passes through main air flow passageway 30. As main air flow 40 reaches core engine passageway 32, it becomes the core engine or compressor inlet air flow indicated by and moving generally in the direction of arrow 42.

As further shown in FIG. 1, air inlet 24 has a mean air inlet angle which is generally defined by the dashed line 44 relative to outer wall 14. Inner wall 16 also has a humped-shaped portion indicated by 46. The peak (also referred to as the "rain step") of humped-shaped portion 46 is indicated as 50. The dashed line indicated by 54 at or proximate rain step 50 defines the throat width of intake passageway 26. The dashed line indicated by 58 at or proximate splitter 18 defines the entrance width of scavenge air flow passageway 28, while the dashed line indicated by 62 defines the exit width of scavenge air flow passageway 28. The dashed line indicated by 66 defines the throat width of main passageway 30, while the dashed line indicated by 70 defines the entrance width of core engine inlet passageway 32.

As further shown in FIG. 1, the distance between the dashed line indicated as 74 extending from rain step 50 and the dashed line indicated as 78 extending from the leading edge of splitter 18 define what is referred to as the splitter hiding height. The dashed line 82 extending from rain step 50 to splitter 18 defines the splitter angle relative to dashed line 74. Between dashed lines 54 and 66 is what is referred to as the inboard surface 86 of inner wall 16. Between dashed lines 66 and 70 is what is referred to as the outboard surface 90 of inner wall 16.

The embodiments of the particle separator of this invention, as well as the embodiments of the method of this invention, are based on the discovery that prior particle separators using, for example, conventional inertial forces may inefficiently separate small particles due to configurations, such as the one illustrated in particle separator 10 of FIG. 1, which are designed to minimize, reduce, etc., the effect on air flow to the compressor which may undesirably affect engine performance. For example, prior particle separators may use relatively conservative designs limiting turning angles and turning lengths, for example, after rain step 50, in order to control boundary layer separation from inboard surface 86 of inner wall 16. The competing issues of inefficient or less efficient small particle separation by the particle separator and avoiding, minimizing, reducing, etc. boundary layer separation (e.g., along inboard surface 86 of inner wall 16) may make it difficult to design a particle separator which maximizes the degree of core air flow 40 from core engine passageway 32 to the compressor of the gas turbine engine, yet at the same time avoiding, minimizing, reducing, etc., the premature erosion of engine surfaces, components, etc., due to the intake of small particles entrained in the inlet air flow (e.g., inlet air flow 34 of FIG. 1).

The embodiments of the particle separator of this invention, as well as the embodiments of the method of this invention, solve these problems by: (1) using different particle separator designs which, for example, increase the inertial forces so that separation of entrained particles from the inlet air stream (e.g., inlet air flow 24) is more efficient and effective to eliminate, or at least minimize, reduce, etc., the presence of such small particles in core air flow 40 in combination with (2) active boundary layer control (e.g., along inboard surface 86 of inner wall 16) to, for example, reduce pressure loss (e.g., increase, maximize, etc., the pressure of core air flow 40) and/or to reduce to the distortion level into the engine. The particle separator designs of the embodiments of this invention enable sharp changes in flow curvature which may be necessary for effective or efficient particle separation, while at the same time using active boundary layer control to prevent or minimize, reduce, etc., flow separation (e.g., from inboard surface 86 of inner wall 16) of the boundary layer which may be associated with prior particle separator designs. Embodiments of the particle separator designs or configurations of this invention may also enhance particle rebound from collisions with appropriately designed or configured surfaces of the particle separator regardless of potential flow separations (e.g., boundary layer flow separations) since flow control may be employed to prevent such separation. Active boundary layer control may be accomplished by using a variety of means, methods, mechanisms, techniques, etc, for example, by exerting suction on the boundary layer, by injecting high velocity air into the boundary layer, etc.

Figure 2:
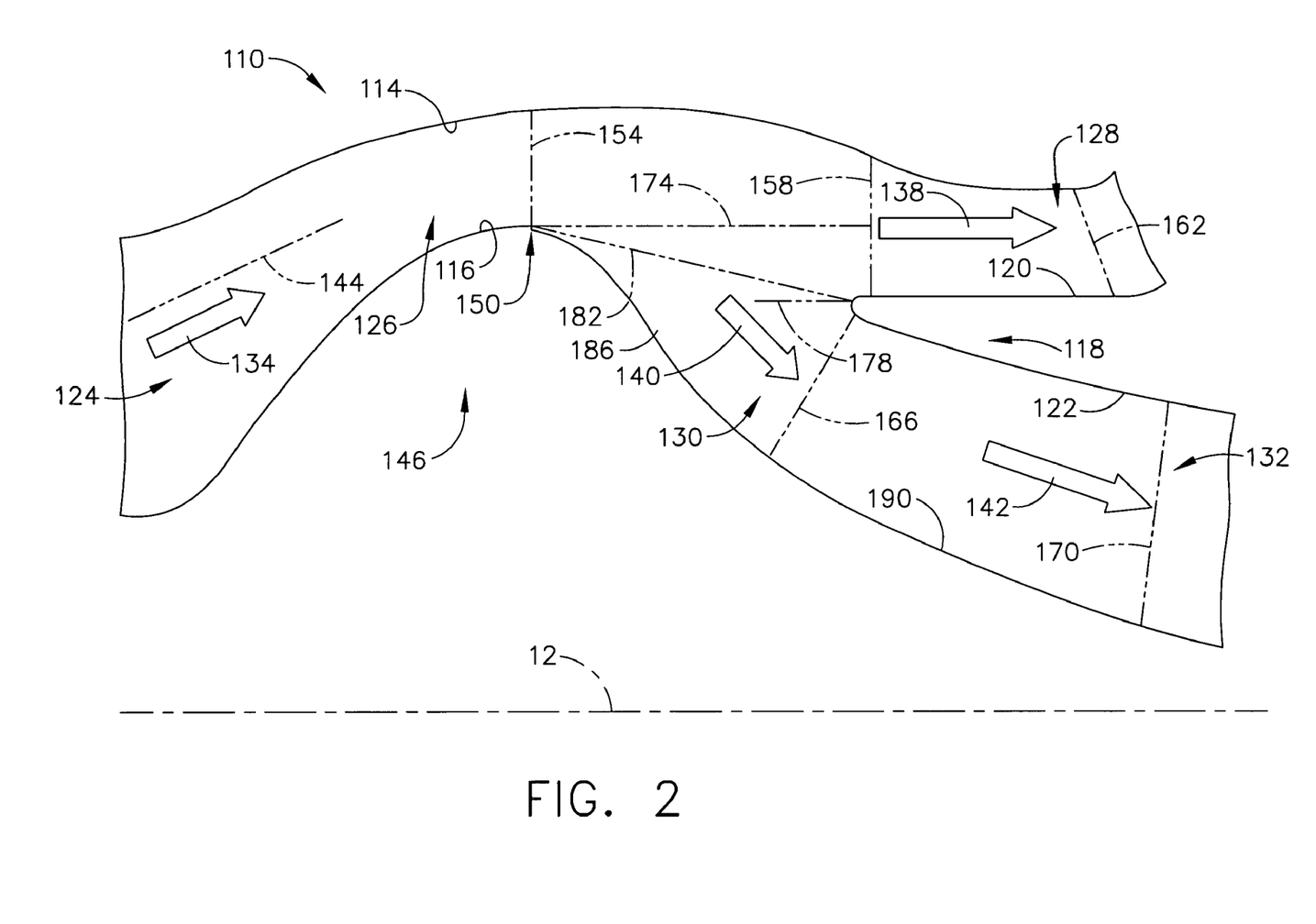
FIG. 2 is a sectional view of a schematic of a particle separator configuration which may be used with embodiments of this invention.

The particle separator illustrated in FIG. 1 provides or represents a baseline for understanding embodiments of the improved particle separator configurations of the present invention. Embodiments of the particle separator of this invention, as well as embodiments of the method of this invention for providing active boundary layer control are illustrated by FIGS. 2-5. An embodiment of a particle separator configuration useful in embodiments of this invention is illustrated in FIG. 2. Referring to FIG. 2, this embodiment of the particle separator is referred to generally as 110. FIG. 2 shows particle separator 110 positioned (like separator 10) relative to the engine center line indicated by dashed line 12. Particle separator 110 comprises an outer wall 114 and an inner wall 116, both relative to engine center line 12, and a splitter indicated generally as 118. Splitter 118 is positioned between inner wall 116 and outer wall 118, and comprises an outer wall 120 and an inner wall 122, also both relative to engine center line 12.

Particle separator 110 is provided with an air inlet/air intake, indicated generally as 124 and an air intake passageway indicated generally as 126 defined by outer and inner walls 114 and 116 respectively. Aft or rearward of intake passageway 126, splitter 118 defines or divides particle separator 110 into a scavenge air flow passageway indicated generally by 128 and a main/core passageway indicated generally as 130. At the trailing or rearward end of main passageway 130 is the core engine/compressor inlet passageway indicated generally as 132 which leads to the compressor section (not shown) of the gas turbine engine.

As shown in FIG. 2, air entering air inlet 124 provides initially an inlet air flow indicated by and moving generally in the direction of arrow 134. As inlet air flow 134 passes through intake passageway 126 and reaches splitter 118, it is divided into a scavenge air flow indicated by and moving generally in the direction of arrow 138 which passes through scavenge air flow passageway 128, and a main/core air flow indicated by and moving generally in the direction of arrow 140 which passes through main air flow passageway 130. As main air flow 140 reaches core engine passageway 132, it becomes the core engine/compressor inlet air flow indicated by and moving generally in the direction of arrow 142.

As further shown in FIG. 2, air inlet 124 has a mean air inlet angle which is generally defined by the dashed line 144 relative to outer wall 114. Inner wall 116 also has a humped-shaped portion indicated by 146. The peak (or "rain step") of humped-shaped portion 146 is indicated as 150. The dashed line indicated by 154 at or proximate rain step 150 defines the throat width of intake passageway 126. The dashed line indicated by 158 at or proximate splitter 118 defines the entrance width of scavenge air flow passageway 128, while the dashed line indicated by 162 defines the exit width of scavenge air flow passageway 128. The dashed line indicated by 166 defines the throat width of main passageway 130, while the dashed line indicated by 170 defines the entrance width of core engine inlet passageway 132.

As further shown in FIG. 2, the distance between the dashed line indicated as 174 extending from rain step 150 and the dashed line indicated as 178 extending from the leading edge of splitter 118 define the splitter hiding height. The dashed line 182 extending from rain step 150 to splitter 118 defines the splitter angle relative to dashed line 174. Between dashed lines 154 and 166 is the inboard surface 186 of inner wall 116. Between dashed lines 166 and 170 is the outboard surface 190 of inner wall 116.

As shown in FIG. 2, the configuration of the hump-shaped portion 146 of inner wall 116 has been modified, changed, adjusted, altered, etc. (relative to the baseline configuration illustrated in FIG. 1), such that the radius of curvature is decreased and corresponds to a degree of curvature in the range of from about 30 to about 60 degrees and such that hump-shaped portion 146 is raised to increase the splitter hiding height (defined between lines 174 and 178), thus improving particle separation efficiency. Hump-shaped portion 146 may be raised, for example, at least about 0.3 inches (about 0.75 cm), e.g., from about 0.3 to about 0.5 inches (from about 0.75 to about 1.3 cm) relative to the baseline height (illustrated in FIG. 1). More typically, hump-shaped portion 146 may be raised about 0.4 inches (about 1 cm) relative to the baseline height, thus increasing the splitter hiding height (defined by the distance between lines 174 and 178), for example, from a baseline height of about 0.45 inches (about 1.1 cm), to a height of about 0.5 inches (about 1.3 cm) or greater, for example, about 0.7 inches (about 1.8 cm) or greater, e.g., about 0.8 inches (about 2 cm) or greater, and thus increasing the splitter angle (defined between line 182 and 174), for example, from a baseline of about 7.5 degrees, to about 8 degrees or greater (e.g. from about 8 to about 14 degrees), for example about 10 degrees or greater, e.g., about 13 degrees or greater. By raising hump-shaped portion 146, at least two detrimental effects may be imparted to the particle separator, namely increasing air flow velocity in the intake passageway 126, as well as increasing the pressure loss characteristics or properties of the core air flow 140 and the core engine inlet air flow 142. By adding boundary layer control in embodiments of the present invention, for example, in the form of boundary layer suction by withdrawing core air flow 240 in the area of inboard surface 186, by injecting a small amount of high velocity air flow parallel to the inboard surface 186 surface at or proximate rainstep 150, etc., flow separation and increased pressure loss in core flow 130 may be avoided, minimized, decreased, reduced, etc. Embodiments of the present invention thus provides increased splitter hiding height (i.e., as defined by the distance between lines 174 and 178) and, hence, increased particle separation efficiency without an increase in pressure loss into core air flow 140 and core engine inlet air flow 142.

Figure 3:
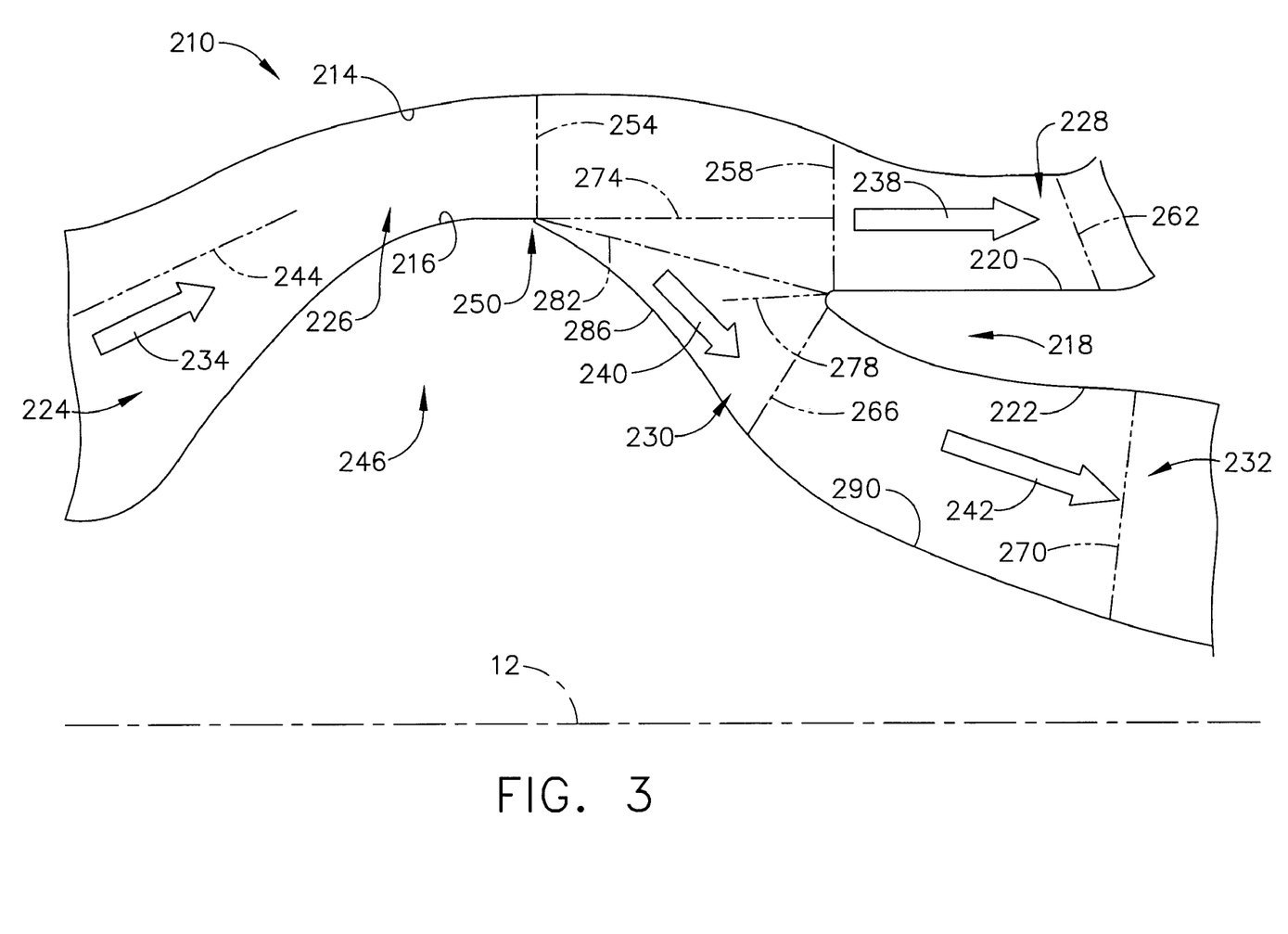
FIG. 3 is a sectional view of a schematic of another particle separator configuration which may be used with embodiments of this invention.

Another embodiment of a particle separator configuration useful in embodiments of this invention is illustrated in FIG. 3. Referring to FIG. 3, this embodiment of the particle separator is referred to generally as 210. Like particle separator 10 and 110, particle separate 210 is positioned relative to the engine center line indicated by dashed line 12. Particle separator 210 comprises an outer wall 214 and an inner wall 216, both relative to engine center line 12, and a splitter indicated generally as 218. Splitter 218 positioned between inner wall 216 and outer wall 218, and comprises an outer wall 220 and an inner wall 222, also both relative to engine center line 12.

Particle separator 210 is provided with an air inlet/air intake, indicated generally as 224 and an air intake passageway indicated generally as 226 defined by outer and inner walls 214 and 216 respectively. Aft or rearward of intake passageway 226, splitter 218 defines or divides particle separator 210 into a scavenge air flow passageway indicated generally by 228 and a main/core passageway indicated generally as 230. At the trailing or rearward end of main passageway 230 is the core engine/compressor inlet passageway indicated generally as 232 which leads to the compressor section (not shown) of the gas turbine engine.

As shown in FIG. 2, air entering air inlet 224 provides initially an inlet air flow indicated by and moving generally in the direction of arrow 234. As inlet air flow 234 passes through intake passageway 226 and reaches splitter 218, it is divided into a scavenge air flow indicated by and moving generally in the direction of arrow 238 which passes through scavenge air flow passageway 228, and a main/core air flow indicated by and moving generally in the direction of arrow 240 which passes through main air flow passageway 230. As main air flow 240 reaches core engine passageway 232, it becomes the core engine/compressor inlet air flow indicated by and moving generally in the direction of arrow 242.

As further shown in FIG. 3, air inlet 224 has a mean air inlet angle which is generally defined by the dashed line 244 relative to outer wall 214. Inner wall 216 also has a humped-shaped portion indicated by 246. The peak (or "rain step") of humped-shaped portion 246 is indicated as 250. The dashed line indicated by 254 at or proximate rain step 250 defines the throat width of intake passageway 226. The dashed line indicated by 258 at or proximate splitter 218 defines the entrance width of scavenge air flow passageway 228, while the dashed line indicated by 262 defines the exit width of scavenge air flow passageway 228. The dashed line indicated by 266 defines the throat width of main passageway 230, while the dashed line indicated by 270 defines the entrance width of core engine inlet passageway 232.

As further shown in FIG. 3, the distance between the dashed line indicated as 274 extending from rain step 250 and the dashed line indicated as 278 extending from the leading edge of splitter 218 define what is referred to as the splitter hiding height. The dashed line 282 extending from rain step 250 to splitter 218 defines the splitter angle relative to dashed line 274. Between dashed lines 254 and 266 is the inboard surface 286 of inner wall 216. Between dashed lines 266 and 270 is the outboard surface 290 of inner wall 216.

In FIG. 3, the configuration of the hump-shaped portion 246 of inner wall 216 has been modified, changed, adjusted, altered, etc. (relative to the baseline configuration of in FIG. 1), such that the radius of curvature is decreased and corresponds to a degree of curvature in the range of from about 30 to about 60 degrees and such that hump-shaped portion 246 has been raised to increase splitter hiding height, as well as moving that hump-shaped portion 246 rearward or aft, thus improving particle separation efficiency. Hump-shaped portion 246 may be raised, for example at least about 0.3 inches (0.75 cm), e.g., from about 0.3 to about 0.5 inches (from about 0.75 to about 1.3 cm), as well as being moved aft, for example at least about 0.3 inches (0.75 cm), e.g., from about 0.3 to about 0.5 inches (from about 0.75 to about 1.3 cm), relative to the baseline configuration illustrated in FIG. 1. More typically, hump-shaped portion 246 may be raised about 0.4 inches (about 1 cm) and may be moved aft about 0.4 inches (about 1 cm), relative to the baseline configuration of in FIG. 1, thus increasing the splitter hiding height (i.e., as defined by the distance between lines 274 and 278), for example, from a baseline height of about 0.45 inches (about 1.1 cm), to a height of about 0.5 inches (about 1.3 cm) or greater, for example, about 0.7 inches (about 1.8 cm) or greater, e.g., about 0.8 inches (about 2 cm) or greater, and thus increasing the splitter angle (i.e., as defined between line 282 and line 274), for example, from a baseline of about 7.5 degrees, to about 10 degrees or greater (e.g., from about 10 to about 16 degrees), for example about 13 degrees or greater, e.g., about 15 degrees or greater. As discussed with reference to separator 110 of FIG. 2, by raising and repositioning hump 246 two detrimental effects on the particle separator, namely it would increase the air flow velocity in the intake passageway 226 and it would increase the pressure loss characteristics of the core air flow 240 and the core engine inlet air flow 242. By adding boundary layer control in embodiments of the present invention, for example, in the form of boundary layer suction by withdrawing core air flow 240 in the area of inboard surface 186, by injecting a small amount of high velocity air flow parallel to the inboard surface 286 at or proximate rainstep 250, etc., flow separation and increased pressure loss in core air flow 240 may be avoided, minimized, decreased, reduced, etc. Embodiments of the present invention thus provides increased splitter hiding height (defined by the distance between lines 274 and 278) and, hence, increased particle separation efficiency without an increase in pressure loss into core air flow 240 and core engine inlet air flow 242.

Figure 4:
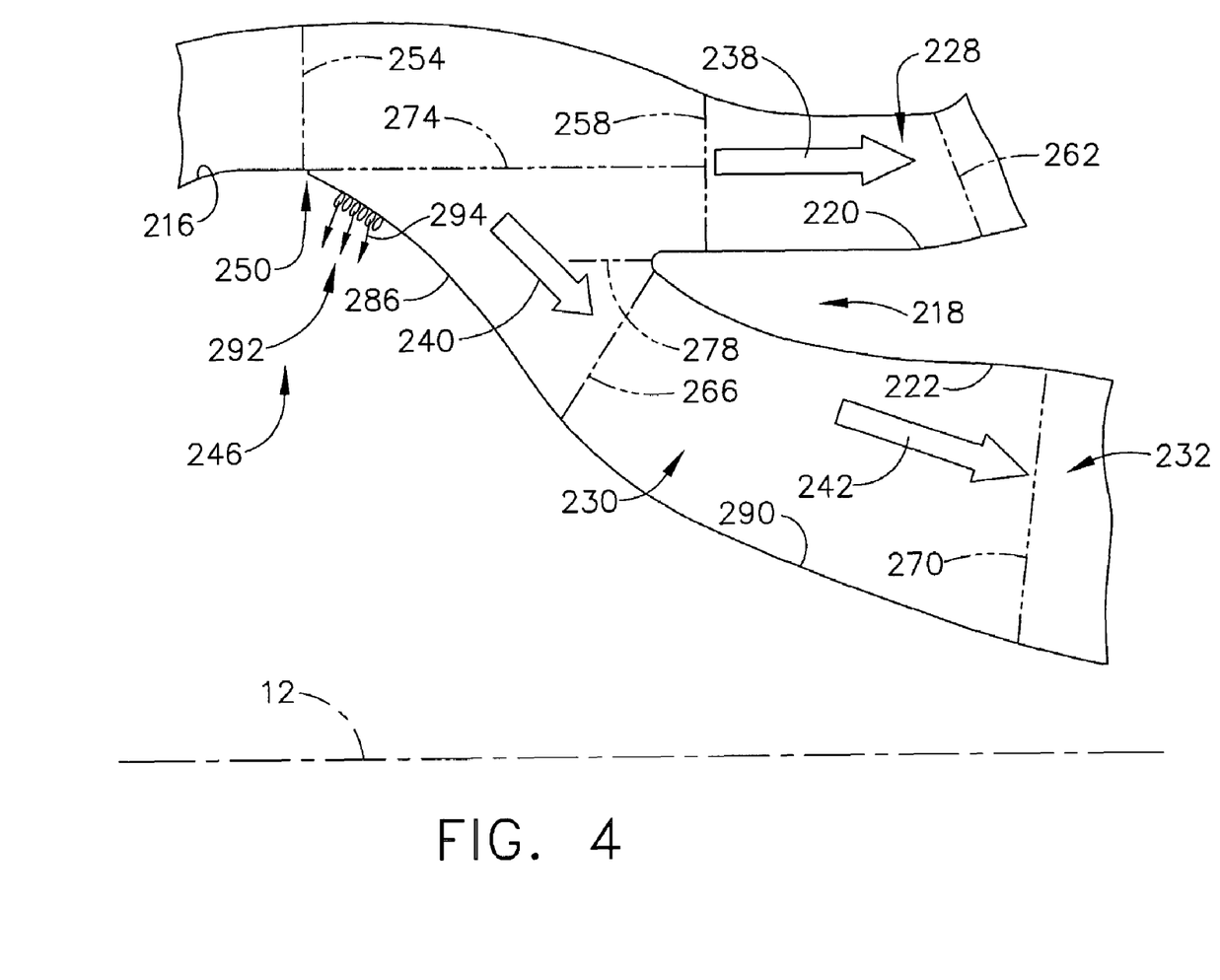
FIG. 4 is an enlarged portion of the particle separator configuration of either FIG. 2 or FIG. 3 illustrating an embodiment of this invention for providing active boundary layer control.

An embodiment for providing active boundary layer flow control is illustrated in FIG. 4. For purposes of illustration, the active boundary layer control embodiment of FIG. 4 is used with reference to the particle separator of configuration 210 of FIG. 3, but could also be used with reference to the particle separator of configuration 110 of FIG. 2 (with appropriate modification), as well as other particle separators having configurations similar to or different from those shown in FIGS. 2-3 which provide an increased splitter hiding height (i.e., as defined by the distance between lines 174/274 and 178/278) and thus decrease the radius of curvature after rain step 150/250, relative to the splitter hiding height (i.e., as defined by the distance between lines 74 and 78) and the radius of curvature after rain step 50 of the baseline configuration illustrated in particle separator 10 of FIG. 1.

The embodiment of FIG. 4 uses boundary layer suction to control flow separation from inboard surface 286. Core air flow 240 may be withdrawn from the core flowpath through an area having a plurality of, for example, perforations, slots, etc., indicated as 292, in inboard surface 286 such that a portion of the core air flow 240 is withdrawn, as indicated by arrows 294, by a suction system (not shown), thus providing a boundary layer suction. By adding boundary layer control in the form of boundary layer suction, the unstable boundary layer in core air flow 240 may be removed, minimized, etc., in this area. The embodiment of the present invention illustrated in FIG. 4 thus provides increased splitter hiding height (i.e., as defined by the distance between lines 274 and 278) and a decreased radius of curvature, and hence, increased particle separation efficiency without an increase in pressure loss into core air flow 240 and core engine inlet air flow 242.

Figure 5:
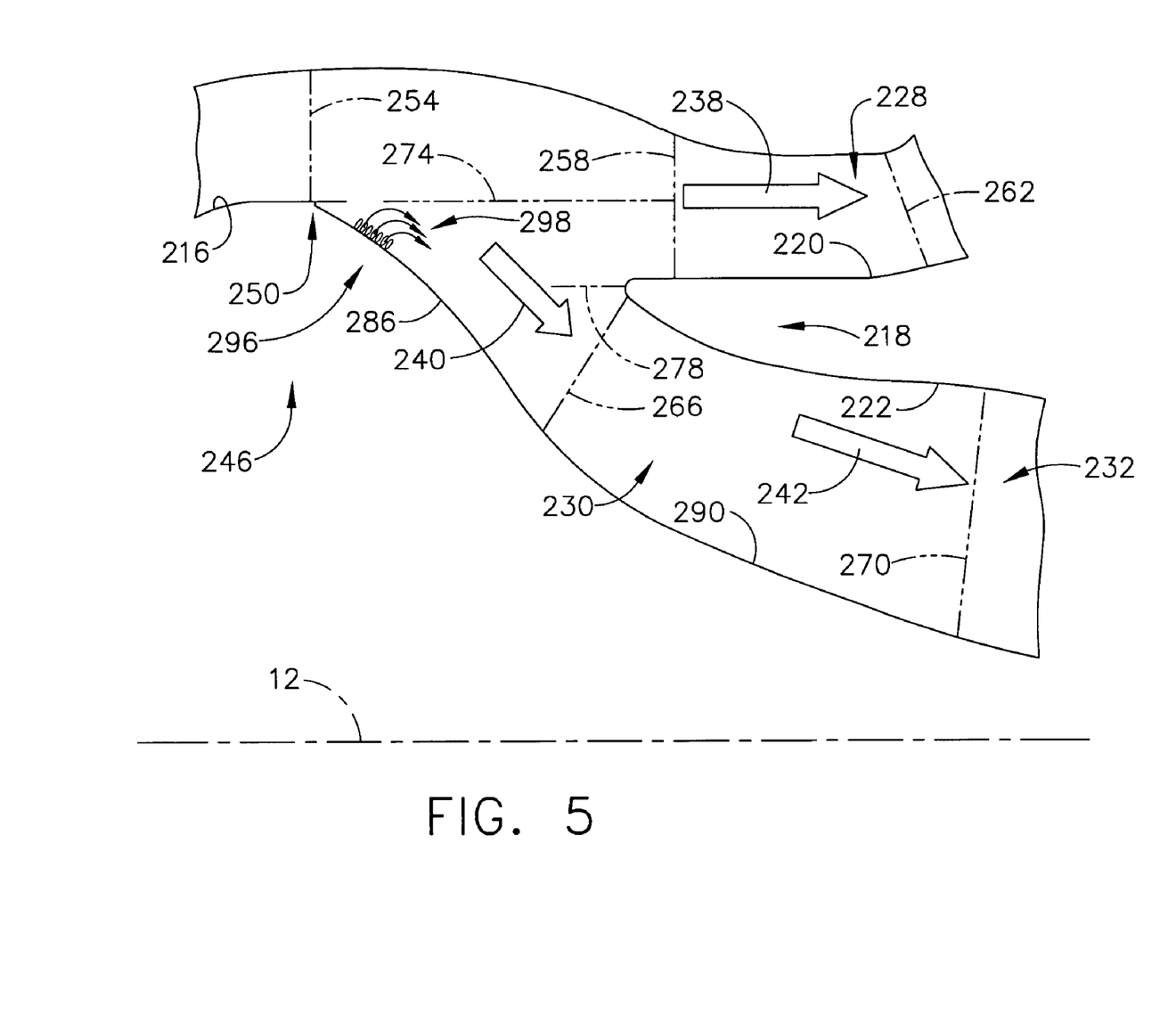
FIG. 5 is an enlarged portion of the particle separator configuration of either FIG. 2 or FIG. 3 illustrating another embodiment of this invention for providing active boundary layer control.

Another embodiment for providing active boundary layer control is illustrated in FIG. 5. For purposes of illustration, the active boundary layer control embodiment of FIG. 5 is again used with reference to the particle separator of configurations 210 of FIG. 3, but could also be used with reference to the particle separator of configuration 110 of FIG. 2 (with appropriate modification), as well as other particle separators having configurations similar to or different from those shown in FIGS. 2-3 which provide an increased splitter hiding height (i.e., as defined by the distance between lines 174/274 and 178/278) and decrease the radius of curvature after rain step 150/250, relative to splitter hiding height (i.e., as defined by the distance between lines 74 and 78) and the radius of curvature after rain step 50 of the baseline configuration illustrated in particle separator 10 of FIG. 1.

The embodiment of FIG. 5 uses boundary layer injection to control flow separation from inboard surface 286. In this embodiment, a small amount of high velocity air is injected using air injection system (not shown), through air flow guides in the form of, for example, a plurality of louvers, indicated as 296, positioned along inboard surface starting at or proximate to rainstep 250. These louvers 296 then direct the energizing air flow, as indicated by arrows 296, parallel or substantially parallel to inboard surface 286, thus energizing the boundary layer in this area. By adding boundary layer control in the form of air injection (as provided by the air flow injected through louvers 296 providing energizing air flow 298), flow separation and increased pressure loss in the core air flow 240 may thus may be avoided, minimized, decreased, reduced, etc. The embodiment of the present invention illustrated in FIG. 5 thus provides increased splitter hiding height (i.e., as defined by the distance between lines 274 and 278) and decreased radius of curvature, and hence, increased particle separation efficiency without an increase in pressure loss into core air flow 240 and core engine inlet air flow 242.

Figure 6:
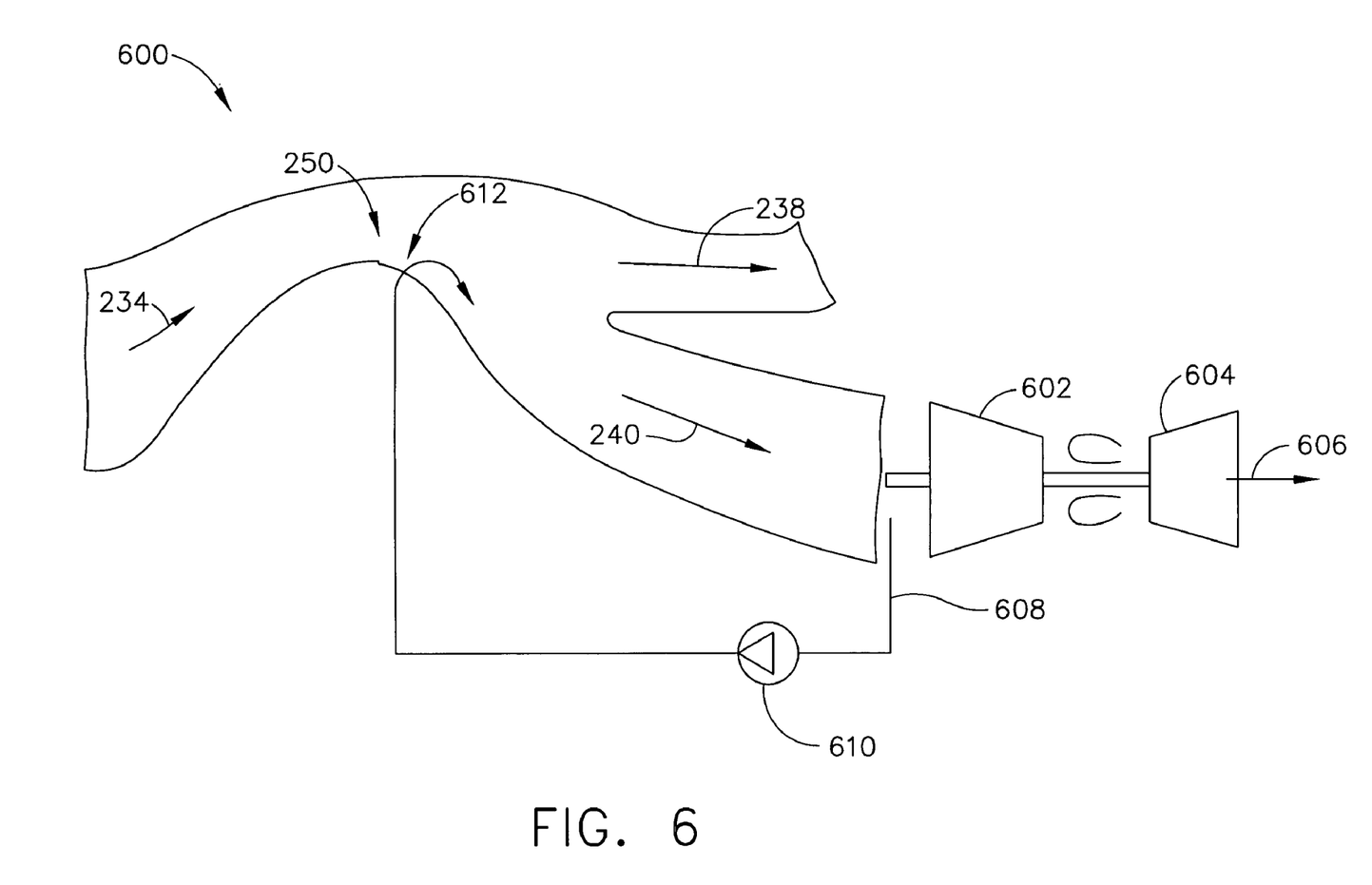
FIG. 6 is a schematic of an embodiment of a gas turbine engine design to illustrate potential sources of air from a gas turbine engine for providing active boundary layer control.

An embodiment of a gas turbine engine design to illustrate potential sources of air from a gas turbine engine for providing active boundary layer control, for example, via air injection, according to the embodiment of FIG. 4, is shown schematically in FIG. 6, and is indicated generally as 600. Engine 600 includes a first compressor stage, indicated as 602, second through sixth compressor stages, indicated as 604, and a core air flow exit, indicated as 606. This embodiment uses air flow (e.g., clean air flow) from the core flowpath to provide the boundary layer injection flow. This air flow may be removed from the core flowpath at a point, indicated as 608, before first stage compressor 602 and may then be pumped to a higher pressure by a separately driven air pump 610. This clean air flow may then be reinjected at the point indicated by arrow 612, near the rainstep 250.

Figure 7:
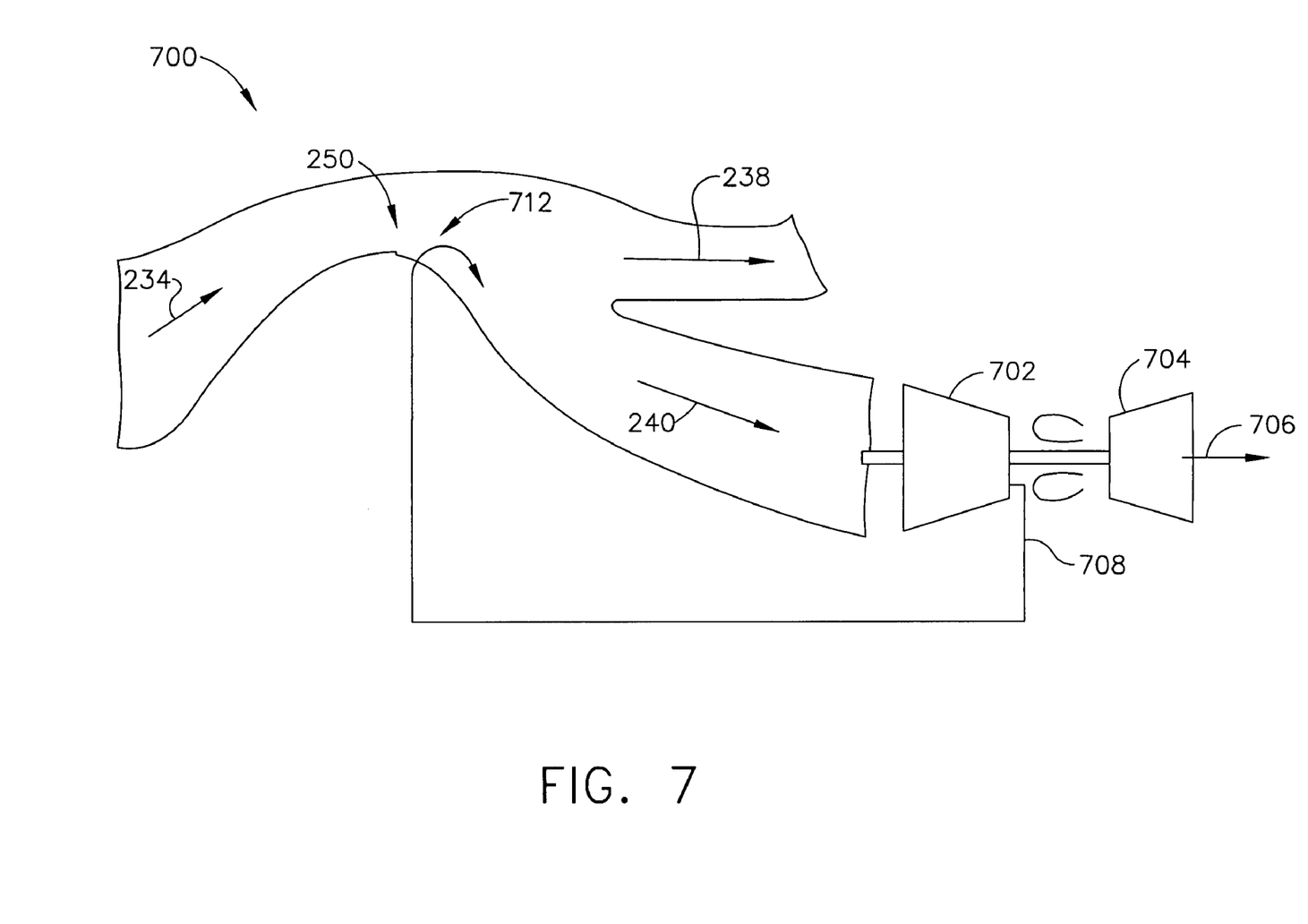
FIG. 7 is a schematic of alternative embodiment of a gas turbine engine design of FIG. 6.

An alternate embodiment of the gas turbine engine design of FIG. 6, is shown schematically in FIG. 7, and is indicated generally as 700. Engine 700 includes a first compressor stage, indicated as 702, second through sixth compressor stages, indicated as 704, and a core air flow exit, indicated as 706. This embodiment uses air flow (e.g., clean air flow) from compressor bleed to provide the boundary layer injection flow. This flow may be obtained from engine 700 after the first compressor stage 702 and before second through sixth compressor stages 706 at a point, indicated as 708. Since the air flow is already at a higher pressure due to passage through first stage compressor 702, no separately driven pump is required, as in engine 600. This clean air flow which is taken (as compressor bleed air flow) may be reinjected, as indicated by arrow 712, proximate rainstep 250.

Embodiments of this invention may also be used with particle separators and methods disclosed, for example, in copending U.S. nonprovisional application entitled "ADAPTIVE INERTIAL PARTICLE SEPARATORS AND METHODS OF USE" (Higgins et al), Ser. No. 11/528,219, filed Sep. 27, 2006, which is incorporated by reference, and which also discloses means, methods, mechanisms, techniques, etc., for active boundary layer control, for example, an air injection system (see, for example, FIG. 4 of the Higgins et al. application which provides a plurality of fluid exit slots 56 in the inboard surface to facilitate returning energizing air flow to the boundary layer) for energizing the boundary layer as illustrated in the embodiment of FIG. 5, as well as FIGS. 6-7, of the present application or a boundary layer suction system as illustrated in the embodiment of FIG. 4 of the present application (e.g., by reversing or sucking the air flow through the plurality of fluid exit slots 56 illustrated in FIG. 4 of the Higgins et al. application).

While specific embodiments of the system and method of this invention have been described, it will be apparent to those skilled in the art that various modifications thereto can be made without departing from the spirit and scope of this invention as defined in the appended claims.

What is claimed is:

1. A particle separator comprising:
   an inner wall, an outer wall and a splitter, wherein the inner and outer walls define an air intake passageway, and wherein the splitter is positioned between the inner and outer walls so as to define a scavenge air flow passageway connected to the intake passageway and a main air flow passageway connected to the intake passageway;

the inner wall having a humped-shaped portion between the intake passageway and the main air flow passageway;

the humped-shaped portion having a peak and a radius of curvature at any point on the hump-shaped portion of the inner wall after the peak corresponding to a degree of curvature of from about 30 to about 60 degrees; and a boundary layer control mechanism for providing active boundary layer control along the inner wall after the peak and within the main air flow passageway wherein the boundary layer control mechanism injects a core mass flow along an inboard surface of the innerwall.

2. The separator of claim 1, wherein the boundary layer control mechanism comprises an air injection system.

3. The separator of claim 2, wherein the air injection system injects core engine inlet air flow into an injection area along the inner wall after the peak and within the main air flow passageway.

4. The separator of claim 2, wherein the air injection system injects compressor bleed air flow into an injection area along the inner wall after the peak and within the main air flow passageway.

5. A particle separator comprising:
an inner wall, an outer wall and a splitter, wherein the inner and outer walls define an air intake passageway, and wherein the splitter is positioned between the inner and outer walls so as to define a scavenge air flow passageway connected to the intake passageway and a main air flow passageway connected to the intake passageway;

the inner wall having a humped-shaped portion between the intake passageway and the main air flow passageway;

the humped-shaped portion having a peak and a radius of curvature at any point on the hump-shaped portion of the inner wall after the peak corresponding to a degree of curvature of from about 30 to about 60 degrees; and a boundary layer control mechanism for providing active boundary layer control along the inner wall after the peak and within the main air flow passageway, wherein the boundary layer control mechanism comprises an air suction system that removes a portion of the boundary layer from a core airflow.

6. The separator of claim 5, wherein the air suction system removes core air flow from a suction area along the inner wall after the peak and within the main air flow passageway, to thereby cause suction on the boundary layer.

7. The separator of claim 6, wherein the suction area comprises a perforated area along the along the inner wall after the peak.

8. The separator of claim 1, having a splitter hiding height measured between the peak and the splitter of about 0.5 inches or greater.

9. The separator of claim 8, wherein the splitter hiding height is about 0.7 inches or greater.

10. The separator of claim 9, wherein the splitter hiding height is about 0.8 inches or greater.

11. The separator of claim 1, having a splitter angle measured between the peak and the splitter of about 8 degrees or greater.

12. The separator of claim 11, having a splitter angle of about 10 degrees or greater.

13. The separator of claim 12, having a splitter angle of about 13 degrees or greater.

14. A method comprising the following steps:
(a) providing a particle separator comprising an inner wall, an outer wall and a splitter, wherein the inner and outer walls define an air intake passageway, and wherein the splitter is positioned between the inner and outer walls so as to define a scavenge air flow passageway connected to the intake passageway and a main air flow passageway connected to the intake passageway, the inner wall having a humped-shaped portion between the intake passageway and the main air flow passageway, the humped-shaped portion having a peak and a radius of curvature at any point on the hump-shaped portion of the inner wall after the peak corresponding to a degree of curvature of from about 30 to about 60 degrees; and (b) providing active boundary layer flow control along the inner wall after the peak and within the main air flow passageway by injecting a core mass flow along an inboard surface of the innerwall.

15. The method of claim 14, wherein the active boundary layer control comprises injecting air flow into the boundary layer at an injection area along the inner wall after the peak and within the main air flow passageway.

16. A method comprising the following steps:
(a) providing a particle separator comprising an inner wall, an outer wall and a splitter, wherein the inner and outer walls define an air intake passageway, and wherein the splitter is positioned between the inner and outer walls so as to define a scavenge air flow passageway connected to the intake passageway and a main air flow passageway connected to the intake passageway, the inner wall having a humped-shaped portion between the intake passageway and the main air flow passageway, the humped-shaped portion having a peak and a radius of curvature at any point on the hump-shaped portion of the inner wall after the peak corresponding to a degree of curvature of from about 30 to about 60 degrees; and (b) providing active boundary layer flow control along the inner wall after the peak and within the main air flow passageway, wherein the active boundary layer flow control comprises removing a portion of the boundary layer from a core airflow at a suction area along the inner wall after the peak and within the main air flow passageway.

17. The method of claim 14 further comprising the following steps of:
(c) removing core engine inlet air flow proximate the core engine inlet passageway;
(d) pressurizing the core engine inlet air flow; and
(e) injecting the pressurized core engine inlet air flow proximate the injection area.

18. The method of claim 14, further comprising the following steps of:
(c) removing compressor bleed air flow; and
(d) injecting compressor bleed air flow proximate the injection area.

19. The method of claim 14, wherein the separator has a splitter hiding height measured between the peak and the splitter of about 0.7 inches or greater.

20. The method of claim 14, wherein the separator has a splitter angle measured between the peak and the splitter of about 10 degrees or greater.

* * * * *